(No Model.)
S. W. CATELY.
REACH COUPLING FOR CARRIAGES.
No. 349,302. Patented Sept. 21, 1886.
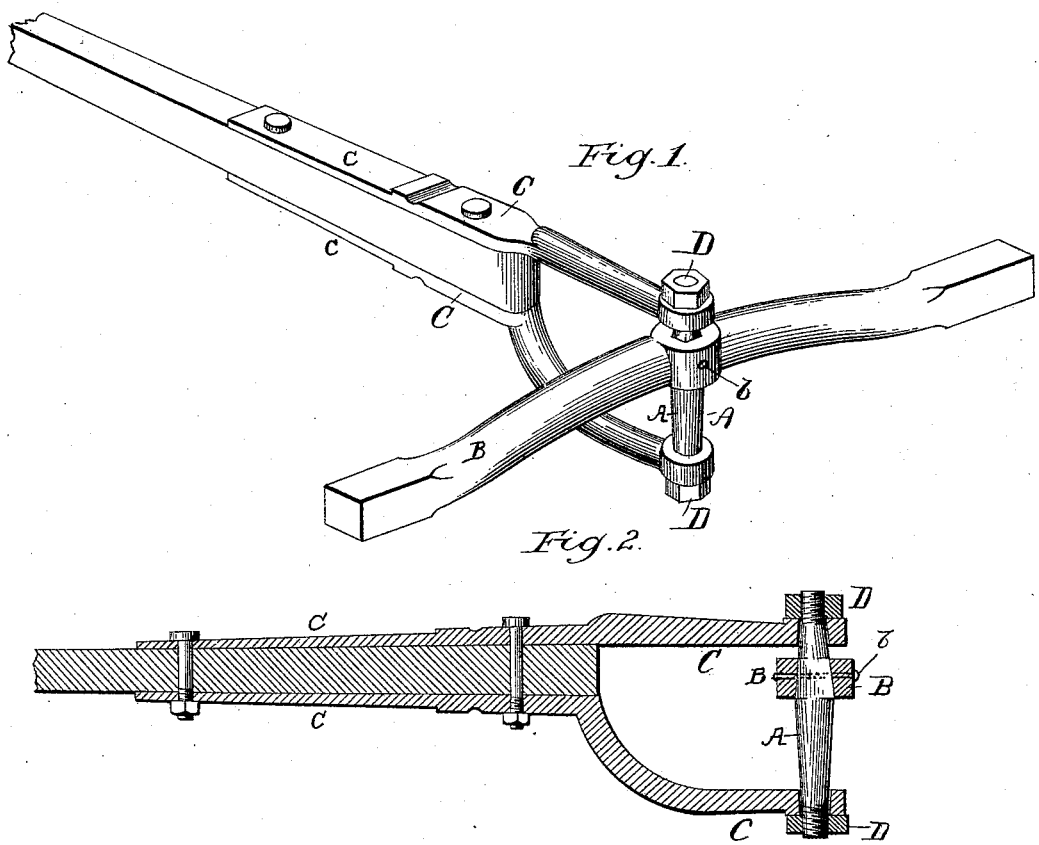

UNITED STATES PATENT OFFICE.

SHEPARD W. CATELY, OF CORTLAND, NEW YORK, ASSIGNOR OF ONE-HALF TO THE HITCHCOCK MANUFACTURING COMPANY, OF SAME PLACE.

REACH-COUPLING FOR CARRIAGES.

SPECIFICATION forming part of Letters Patent No. 349,302, dated September 21, 1886.

Application filed April 23, 1886. Serial No. 199,956. (No model.)

*To all whom it may concern:*

Be it known that I, SHEPARD W. CATELY, a citizen of the United States, residing at Cortland, in the county of Cortland and State of New York, have invented a certain new and useful Improvement in Carriages in Connecting the Reach with the Front Axle; and I do hereby declare that the following is as full, clear, and exact a description of the invention as I am able to give, which will enable others skilled in the art to which it applies to make and use the same, reference being had to accompanying drawings, and the letters marked thereon, which form a part of my specification.

Figure 1 is a perspective view of such parts of the running-gear of a carriage or wagon as will illustrate the application of my invention, and Fig. 2 is a sectional view of the same.

The improvement relates to carriages or wagons.

The object of the invention is to provide an improved method of coupling the reach and axle by the king-bolt, whereby certain advantages result over the methods ordinarily in use.

To effect this result the invention consists in the following construction and arrangement of the parts, which will first be definitely described, and the points of novelty then set forth in the claims.

B represents an axle of a vehicle. It is provided with an enlargement at its mid-length, through which is pierced a vertical opening or mortise having, preferably, angular converging sides similar to the frustum of a pyramid. The king-bolt A is double-cone shaped, as shown, except the threaded ends thereof, and that part which is received into the opening in the axle and corresponds in shape therewith.

C are the reach-plate irons which are bolted to the reach, and extend as shown, the lower one being curved so as to embrace the king-bolt at a greater distance below the axle than the upper one is above the axle. These reach-plates may be straight, however, and disposed differently in their relative positions above and below the axle. The holes in the reach-plates C through which the king-bolt passes are tapered or conical corresponding to the king-bolt. The king-bolt is driven or fitted rigidly in the axle, and a rivet, *b*, may be passed through the axle and king-bolt to secure them.

D are nuts on the opposite ends of the king-bolt for securing the reach to the axle. These nuts also take up the wear or rattling of the parts. The king-bolt is rigid with and does not turn with relation to the axle. The reach-irons turn upon the king-bolt upon what is termed "coned bearings." The peculiar shape of the reach-irons admits of the use of a long center king-bolt, giving great rigidity.

Having described my invention, what I claim is—

1. An integral king-bolt having an intermediate angular bearing, and a coned bearing at the opposite ends of said bolt.

2. A king-bolt having an intermediate angular bearing with converging sides, and a coned bearing at the opposite ends of said bolt.

3. An axle having an angular socket formed therein, a king-bolt having an angular bearing rigidly secured in said socket, and provided also with a coned bearing at its opposite ends, both in combination, as specified.

4. An axle having an angular socket formed therein with converging walls, and a king-bolt having a bearing correspondingly formed, and provided also with a coned bearing at its opposite ends, the two in combination, as set forth.

5. An axle having an angular socket formed therein, a king-bolt having an angular bearing rigidly secured in said socket with a coned bearing at its opposite ends, and a reach having holes fitting over the coned bearings of the king-bolt, all in combination, as set forth.

SHEPARD W. CATELY.

Witnesses:
MARK BROWNELL,
IRVING A. BENEDICT.